April 13, 1948.  W. CASTEDELLO  2,439,417
PHOTOFLASH SYNCHRONIZING DEVICE FOR CAMERAS
Filed Aug. 6, 1946
FIG. I.
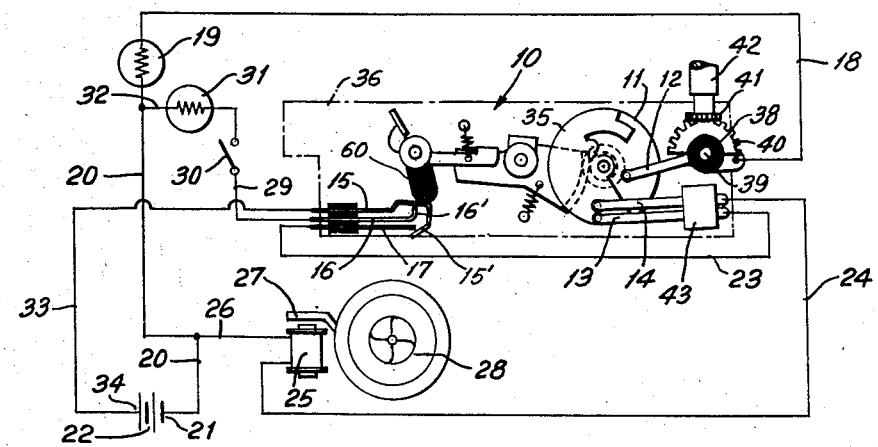
FIG. 2.
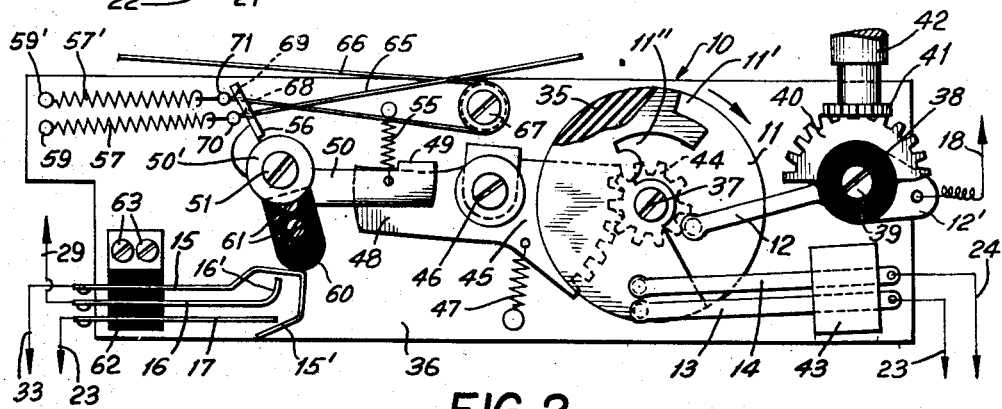
FIG. 3.
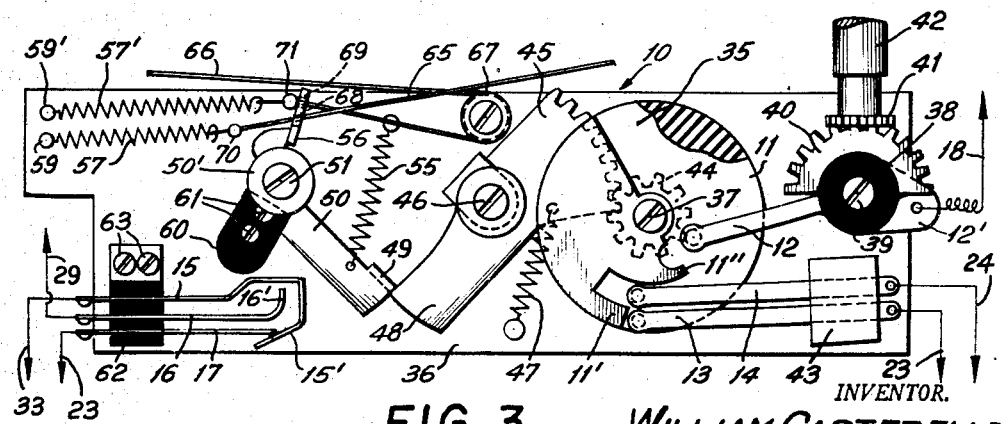
INVENTOR.
WILLIAM CASTEDELLO
BY
Frederick E. Harris
ATTORNEY Patented Apr. 13, 1948

2,439,417

UNITED STATES PATENT OFFICE 2,439,417

PHOTOFLASH SYNCHRONIZING DEVICE FOR CAMERAS

William Castedello, Stamford, Conn., assignor to The Kalart Company Inc., Stamford, Conn.

Application August 6, 1946, Serial No. 688,741

11 Claims. (Cl. 95—11.5)

This invention relates to a device for synchronizing the operations of a photographic apparatus and a flash lamp, and more particularly to synchronizing devices for tripping a camera shutter and firing a flash lamp at a selected time relationship with respect to each other.

For best results in the use of photoflash work, the operation of the camera shutter has to be properly timed and synchronized with the flash of the flash lamp so that the flash lamp is producing its peak illumination during the time the shutter is substantially fully opened. If the firing of the lamp and the tripping of the camera shutter were not properly timed, unsatisfactory results are obtained, as peak illumination occurs either before or after the shutter is fully opened. In many cases, for instance when moving objects are to be photographed which require quickly acting shutters, considerable illumination of the object is required to attain sufficient density of the negative. Such considerable illumination of an object can be attained only when peak illumination and full opening of the shutter substantially coincide.

The period of time, herein sometimes referred to as "shuttertime," between tripping of a shutter and full opening of the shutter is a substantially constant one for each given type of shutter, as is the period of time, herein sometimes referred to as "lamptime," between firing of a flash lamp and reaching peak illumination for each given type of flash lamp. However, the lamptime varies within a wide range for different types of flash lamps, for instance so called gaseous discharge lamps employing mercury and other vapors will reach peak illumination practically instantaneously and develop a flash of extreme brilliancy and very short duration; a flash time of $\frac{1}{50000}$ of a second has been claimed. Other flash lamps or bulbs require a lamp time of about $\frac{20}{1000}$ of a second. As a result, a synchronizing device adjusted for operation of a shutter in conjunction with a certain type of flash lamp will not synchronize correctly when a type of lamp is used having a different lamp time.

One of the objects of this invention is a novel and improved synchronizing device for accurately synchronizing shuttertime and lamptime.

Another object of the invention is a novel and improved synchronizing device by means of which a definite time relationship between peak illumination and full shutter opening is attainable.

Another object of the invention is to provide a novel and improved synchronizing device which permits the use of flash lamps having different lamp times while retaining a correct time relationship between shuttertime and lamptime.

Another object of the invention is a novel and improved synchronizing device which can be accurately and conveniently adjusted according to the specific lamptime of a flash lamp to be used.

Another object of the invention is a novel and improved synchronizing device by means of which the light unit of a day and night range finder of the type described in U. S. Patent 2,397,160 can be controlled.

Another object of the invention is to provide a novel and improved synchronizing device which is reliable and accurate in operation, and comparatively inexpensive in manufacture.

Another object of the invention is to provide a novel and improved synchronizer which can be conveniently disposed within the casing of a photographic apparatus so as to form an integral part thereof.

Other and further objects, features and advantages of the invention will appear hereinafter and in the appended claims forming part of the application.

In the accompanying drawings, a now preferred embodiment of the invention is shown by way of illustration and not by way of limitation.

Fig. 1 shows diagrammatically a synchronizing device according to the invention and the circuit system thereof.

Fig. 2 shows a detail view of the synchronizing device proper in its inactive or rest position, and Fig. 3 shows the synchronizing device according to Fig. 2 in an intermediate position.

Referring now to the figures in detail, the synchronizing device, as shown in Fig. 1, is generally designated 10, and comprises a shaped contact segment 11 which is slidably engageable by an adjustable contact arm and two stationary contact arms 13 and 14. There are further provided three contact springs 15, 16 and 17 which are normally disengaged with each other but can be deflected into engagement, as will be more fully explained hereinafter.

Adjustable contact arm 12 is connected by a lead 18 to one terminal of a flash lamp or bulb 19 of any suitable design and characteristic. The other terminal of this flash lamp is connected by a lead 20 to one terminal 21 of a source of current 22, such as a battery. Stationary contact arm 13 is connected by a lead 23 to contact spring 17 and stationary contact arm 14 is connected by a lead 24 to one terminal of a solenoid coil 25, the other terminal of solenoid coil 25 being connected by leads 26 and 20 to battery terminal 21. Armature 27 of solenoid coil 25 controls an electromagnetically operated shutter 28 of a camera. Shutter 28 may be of conventional design and is operated in a manner well known to anyone skilled in the art. Contact spring 16 is connected by a lead 29 including a switch 30, operated manually or otherwise, to one terminal of the light unit 31 of a day and night range finder of the type described in U. S. Patent 2,397,-160 to Hyman Schwartz and William Castedello, the other terminal of light unit 31 being connected by leads 32 and 20 to battery terminal 21. Finally contact spring 15 is connected by a lead 33 to the second terminal 34 of battery 22.

The circuit system, as shown in Fig. 1 and described in connection therewith, comprises one flash bulb or lamp 19. However, it should be noted that it is of course also possible and within the scope of the invention to control several flash lamps or bulbs connected in parallel, by a single synchronizing device 10, as is well known in the art. It is further possible to include a booster battery in the circuit system if desired.

The synchronizing device 10 will now be described in detail:

As can best be seen on Figs. 2 and 3, the synchronizing device comprises the previously mentioned contact segment 11 which has circumferential extensions 11' and 11'', the purpose of which will be explained hereinafter. Segment 11 is supported on an insulation disc 35 which is rotatably mounted on a base 36 by means of a pivot 37.

Contact arm 12 which coacts with contact segment 11 is preferably made of springy metal to secure a good sliding contact between segment and contact arm. The contact arm is supported on an insulation knob 38 and connected by any suitable means, for instance by an extension tongue 12' and a pig tail to lead 18. Knob 38 is mounted on a pivot 39 rotatably supported on base 36. Pivot 39 further supports a toothed sector 40 which is engaged by a pinion 41 rotatable by means of a manually operable shaft 42. Shaft 42 may support a pointer coacting with a scale calibrated to indicate the specific time characteristics of the flash bulb or lamp to be controlled. Such time adjustments are well known in the art and need not be described here in detail. It should be noted in this connection that the invention shall not be limited to the adjustment of arm 12 as illustrated herein, but that any other suitable adjustment means may be provided.

Contact arms 13 and 14 are supported, separated from each other, by an insulator block 43 fastened to base 36 by any suitable means.

As will be obvious from Figs. 2 and 3, contact segment 11 will connect contact arms 12, 13 and 14 in certain positions of disc 35. The specific purpose and results of such connections will be more fully explained hereinafter.

Fastened to pivot 37, supporting disc 35, is a gear wheel 44. This gear wheel is engaged by the teeth of a toothed sector 45 pivotal about a pivot 46 fastened to base 36. A loaded spring 47 fastened at one end to base 36 and at the other end to sector 45 is biased to urge the sector and with it disc 35 into the position, as shown in Fig. 2. Sector 45 is provided with an extension arm 48, the upper edge of which is slidably engaged by a nose 49 of an arm 50. Arm 50 is supported by a pivot 51 rotatably mounted on base 36. A spring 55 fastened at one end to base 36 and at the other end to arm 50 is biased to urge arm 50 into the position, as shown in Fig. 2.

In this connection it should be noted that, instead of coil springs 47 and 55, any other suitable type of springs can be employed, such as spiral springs wound around pivots 46 and 51 respectively.

Arm 50 is supported with a slight axial clearance on pivot 51 so that it can tilt relative to the axis of the pivot, thereby permitting nose 49 to slide off arm 48 when arm 50 is rotated clockwise and arm 48 counterclockwise (see Fig. 3) and to re-engage arm 48 when arms 50 and 48 are returned into the respective positions, as shown in Fig. 2, by the action of springs 55 and 47 respectively.

Fastened to a bearing sleeve 50' of arm 50 is an extension 56 having two spaced holes 68 and 69. A flexible wire 65 is passed through hole 68 and fastened to a bead 70 having a diameter larger than hole 68. Bead 70 is attached directly or through an intermediate link to one end of a loaded spring 57, the other end of which is secured at 59 to base 36. Similarly, a second wire 66, is passed through hole 69 and fastened to a bead 71 which in turn is secured to one end of a spring 57' the other end of which is fastened at 59' to base 36.

An extension of arm 50 or bearing sleeve 50' supports an insulation block 60 fastened thereto by screws 61 or any other suitable means and rounded off at its lower end, as clearly shown on Figs. 2 and 3. Insulation block 60 serves to control the relative positions of contact springs 15, 16 and 17. These contact springs are so positioned that an extension 15' of contact spring 15 engages contact spring 17 and that contact spring 15 is disengaged from an extension 16' of contact spring 16 when insulation block 60 is disengaged from contact spring 15 (see Fig. 3). In the rest or inactive position of synchronizing device 10, as shown in Fig. 2, insulation block 60 engages spring contact 15 just sufficiently to separate contact spring extension 15' from contact spring 17 without moving contact spring 15 into engagement with extension 16'. When and while insulation block 60 is moved from the position of Fig. 2 into the position of Fig. 3 and vice versa, contact spring 15 is moved into engagement with extension 16' while spring contact 17 and extension 15' are held disengaged.

The contact springs 15, 16 and 17 are supported by an insulation block 62 fastened by screws 63 or other suitable means to base 36.

Flexible wire 66, guided about a post 67 fastened to base 36, and wire 65 are operatively connected to release buttons at the left and right hand corner of the camera casing (not shown) for left and right hand operation of the synchronizing device.

As will be apparent, a pull on wire 65 due to operation of the release button will cause a clockwise rotation of extension 56 against the action of spring 57, bead 70 causing an expansion of the spring by abutting against extension 56. Spring 57' will not be loaded as wire 66 will slide through hole 69. When wire 66 is pulled, spring 57' is the one which will be loaded as will be evident from the previous explanation.

The release buttons are so arranged that an operation of either button will cause a rotation of extension 56 in clockwise direction, thereby pivoting insulation block 60 from the position shown in Fig. 2 into the position of Fig. 3 and beyond this position. When the operated release button is released, all parts of the synchronizing device return into the positions, as shown in Fig. 2, by the action of the respective springs 47, 55 and 57 or 57'. As the operation of the release buttons is well known in the art, it need not be described here in detail. In this connection it should be noted that instead of flexible wires, chains or other suitable means may be employed. It is of course also possible to operate extension 56 either directly or through a suitable linkage system.

The operation of the synchronizing device, will now be described in detail.

Let it be assumed that it is desired to make a flash picture and that for said purpose the shutter of the camera is cocked in a conventional manner. Let it further be assumed that contact arm 12 is placed in the position, as shown in Fig. 2, and that said position corresponds to the electric characteristics of the flash lamp to be used, that is, to the time required by the lamp to reach peak illumination. Let it finally be assumed that switch 30 in the circuit of light unit 31 is closed. As will appear from an examination of the circuit system according to Fig. 1, all circuits are interrupted so that the electrical components of the device remain inactive in spite of the closing of switch 30. When now either one of the release buttons is operated, arm 50 with insulation block 60, is rotated clockwise, arm 48 with sector 45 is rotated counterclockwise and disc 35 with contact segment 11 is rotated clockwise, as will appear from the previous description. While contact segment 11 is moved from the position of Fig. 2 toward the position of Fig. 3, contact arms 12, 13 and 14 are simultaneously engaged by contact segment 11, thereby effecting an electric connection between the contact arms. However, such electric connection remains ineffective, as insulation block 60 engages contact spring 15 and is holding the same in a position in which extension 15' is dis-engaged from contact spring 17 included in supply lead 33. Insulation block 60, during its aforementioned clockwise rotation, moves contact spring 15 into engagement with extension 16', thereby closing a circuit from battery terminal 34 through lead 33, contact spring 15, extension 16', contact spring 16, lead 29, closed switch 30, light unit 31 of the day and night range finder, leads 32 and 20, to the other battery terminal 21. As a result, light unit 31 will be illuminated during the first part of the release button movement, thereby permitting the operator of the camera to focus the camera lens by placing the light spots produced by the day and night range finder in a predetermined relative position to each other.

When now the operation of the release button is continued and insulation block 60 reaches the position of Fig. 3 in which the insulation block is disengaged from spring contact spring 15, this contact spring returns into its position in which the light unit circuit is interrupted at extension 16' and extension 15' re-engages contact spring 17. Slightly prior thereto, contact segment 11 has reached the position of Fig. 3 in which contact arms 12, 13 and 14 are no longer engaged by contact segments 11.

As the operation of the release button is further continued, nose 49 will slide off the edge of arm 48, thereby permitting spring 47 to snap sector 45 into the position of Fig. 2. Toothed sector 45, during its return movement, will cause disc 35 to rotate counterclockwise into the position of Fig. 2. During this return movement of contact segment 11, it will engage contact arms 12, 13 and 14 at different times. According to the embodiment shown, contact arm 13 will first engage segment extension 11', then contact arm 14 will engage segment 11 after having passed the circumferential recess between segment extensions 11' and 11'', and finally contact arm 12 will engage segment extension 11''. Insulation block 60 will remain disengaged from contact spring 15, thereby permitting an engagement between extension 15' and contract spring 17 until contact arm 12 and segment 11 are in engagement with each other.

During the return movement of segment 11, and while insulation block 60 permits an engagement between contact spring 17 and extension 15', a circuit is first closed for solenoid coil 25 which may be traced from battery terminal 34 through lead 33, contact spring 15, extension 15', contact spring 17, lead 23, contact arm 13, segment 11, contact arm 14, lead 24, coil 25, leads 26 and 20 to battery terminal 21. Solenoid 25 now attracts its armature 27 so that shutter 28 is tripped.

When, due to continued counterclockwise rotation of disc 35, segment 11 engages contact arm 12, a second circuit is closed which may be traced from segment 11 through contract arm 12, lead 18, flash lamp 19 and lead 20 to battery terminal 21, thereby causing the flash lamp to be fired.

The operation of the synchronizing device is now completed and springs 47, 55 and 57 or 57' will return all parts of the device into the position, as shown in Fig. 2, when the operated button is released.

In the embodiment, as above described, the shutter is operated prior to the flash lamp, as is required when the time between tripping of the shutter and the full opening thereof is longer than the time between firing of the flash lamp and peak illumination. The period of time that elapses between shutter operation and flash lamp ignition is a constant one provided the rotational speed of insulation block 60 and disc 35 remain constant. The length of this period is controlled, in addition to the aforementioned rotational speed, by a permanent factor and a variable factor. The permanent factor is determined by the configuration of insulation block 60 and contact segment 11 and by the positions of stationary contact springs 15, 16, 17 and contact arms 13 and 14. The variable factor is controlled by the position of adjustable contact arm 12. As will be evident, practically any desired time relationship between shutter operation and flash lamp ignition can be attained by suitable selection of the permanent factor during manufacturing and assembly of the device and by angular adjustment of contact arm 12 by means of shaft 42. The period of time between shutter operation and flash lamp ignition will be increased by turning contact arm 12 in a clockwise direction and reduced by placing contact arm 12 in a position closer to segment extension 11'' (as seen in the position of segment 11 in Fig. 3). When it is desired to operate the flash lamp prior to the shutter, it is merely necessary to position the contact arms in such a manner that an electrical connection between contact arms 12 and 13 is made prior to an electrical connection between contact arms 13 and 14.

In this connection it should be noted that the illustrated configuration of contact segment 11 is not essential for the invention and that any other configuration may be employed by which a suitable staggered engagement of the contact arms can be attained. Furthermore, the linkage system constituted by arms 50 and 48 can be substituted by any other transmission means accomplishing the same purpose.

While the invention has been described in detail with respect to a certain now preferred example the embodiment of the invention it will be understood by those skilled in the art after understanding the invention, that various changes and modifications may be made without departing from the spirit and scope of the invention and it is intended therefore, to cover all such changes and modifications in the appended claims.

What is claimed as new and desired to be secured by Letters Patent is:

1. A synchronizing device of the type described comprising a shaped contact member movably mounted, a contact arm for slidably engaging said contact member and connected in circuit with a flash lamp and a source of current, a second contact arm for slidably engaging said contact member and connected in circuit with a shutter solenoid and the source of current, a third contact arm for slidably engaging said contact member, a pair of yieldable contacts, one of said contacts electrically connected with the third contact arm, the second contact connected in circuit with the source of current, a movable element coacting with the yieldable contacts, said element constructed and positioned to control engagement between said yieldable contacts by the element position, and means for moving said contact member and said element at a predetermined ratio of movement for placing the contact member in engagement with the contact arms at a predetermined sequence and for opening and closing said yieldable contacts at preselected intervals, thereby causing the solenoid and the flash lamp circuits to be energized at a predetermined time relationship to each other.

2. A synchronizing device of the type described comprising a shaped contact member movably mounted, an adjustable first contact arm for slidably engaging said contact member and connected in circuit with a flash lamp and a source of current, a stationary second contact arm for slidably engaging said contact member and connected in circuit with a shutter solenoid and the source of current, a stationary third contact arm for slidably engaging said contact member, means for adjusting the position of said first contact arm relative to the contact member and the stationary contact arms, a pair of yieldable contacts, one of said contacts electrically connected with the stationary third contact arm, the second contact connected in circuit with the source of current, a movable element coacting with the yieldable contacts, said element constructed and positioned to control engagement between said yieldable contacts by the element position, and means for moving said contact member and said element at a predetermined ratio of movement for placing the contact member in engagement with the contact arms at a predetermined sequence and for opening and closing said yieldable contacts at preselected intervals, thereby causing the solenoid and the flash lamp circuits to be energized at a predetermined time relationship to each other, as controlled by the position of the adjustable first contact arm.

3. A synchronizing device of the type described comprising an insulation disc rotatably mounted, a shaped electrically conductive segment supported on said disc, an adjustable first contact arm for slidably engaging said conductive segment and connected in circuit with a flash lamp and a source of current, a stationary second contact arm for slidably engaging said conductive segment and connected in circuit with a shutter solenoid and the source of current, a stationary third contact arm for slidably engaging said conductive segment, means for adjusting the position of said first contact arm relative to the conductive segment and the stationary contact arms, a pair of yieldable contacts, one of said contacts electrically connected with the stationary third contact arm, the second contact connected in circuit with the source of current, a rotatable element coacting with the yieldable contacts, said element constructed and positioned to control engagement between said yieldable contacts by the element position, and means for rotating said disc and said element at a predetermined ratio of movement for placing the conductive segment in engagement with the contact arms at a predetermined sequence and for opening and closing said yieldable contacts at preselected intervals, thereby causing the solenoid and the flash lamp circuits to be energized at a predetermined variable time relationship to each other, as controlled by the position of the adjustable first contact arm.

4. A synchronizing device of the type described comprising a shaped contact member movably mounted, a contact arm for slidably engaging said contact member and connected in circuit with a flash lamp and a source of current, a second contact arm for slidably engaging said contact member and connected in circuit with a shutter solenoid and the source of current, a third contact arm for slidably engaging said contact member, a pair of yieldable contacts, one of said contacts electrically connected with the third contact arm, the second contact connected in circuit with the source of current, a third yieldable contact connected in circuit with an electric lamp and the source of current, a movable element coacting with the yieldable contacts, said element constructed and positioned to control engagement between said yieldable contacts by the element position, and means for moving said contact member and said element at a predetermined ratio of movement for placing the contact member in engagement with the contact arms at a predetermined sequence and for opening and closing said yieldable contacts at preselected intervals, so as to cause the electric lamp circuit to be closed in response to the first part of a movement of the movable element and the solenoid and flash lamp circuits to be energized at a predetermined time relationship to each other in response to the second part of the element movement.

5. A synchronizing device of the type described comprising an insulation disc rotatably mounted, a shaped electrically conductive segment supported on said disc, an adjustable first contact arm for slidably engaging said conductive segment and connected in circuit with a flash lamp and a source of current, a stationary second contact arm for slidably engaging said conductive segment and connected in circuit with a shutter solenoid and the source of current, a stationary third contact arm for slidably engaging said conductive segment, means for adjusting the position of said first contact arm relative to the conductive segment and the stationary contact arms, a pair of yieldable contacts, one of said contacts electrically connected with the stationary third contact arm, the second contact connected in circuit with the source of current, a third yieldable contact connected in circuit with an electric lamp and the source of current, a rotatable element coacting with the yieldable contacts, said element constructed and positioned to control engagement between said yieldable contacts by the element position, and means for rotating said disc and said element at a predetermined rate of movement for placing the conductive segment in engagement with the contact arms at a predetermined sequence and for opening and closing said yieldable contacts at preselected intervals, so as to cause the electric lamp circuit to be closed in response to the first part of the rotation of said element and the solenoid and flash lamp circuits to be energized at a predetermind variable time relationship to each other in response to the second part of the element rotation.

6. A synchronizing device of the type described comprising a shaped contact member movably mounted, an adjustable first contact arm for slidably engaging said contact member and connected in circuit with a flash lamp and a source of current, a stationary second arm for slidably engaging said contact member and connected in circuit with a shutter solenoid and the source of current, a stationary third contact arm for slidably engaging said contact member, means for adjusting the position of said first contact arm relative to the contact member and the stationary contact arms, a pair of yieldable contacts, one of said contacts electrically connected with the stationary third contact arm, the second contact connected in circuit with the source of current, a movable element coacting with the yieldable contacts, said element constructed and positioned to control engagement between said yieldable contacts by the element position, moving means operatively coupled with the contact member and the movable element, and spring means constructed to be loaded in response to a movement of the moving means in one direction and to return the moving means into its normal position upon completion of a predetermined movement thereof into the said direction, said return movement of the moving means causing the contact member and the movable element to move at a predetermined ratio of movement for placing the contact member in engagement with the contact arms at a predetermined sequence and for opening and closing said yieldable contacts at preselected intervals, thereby causing the solenoid and the flash lamp circuits to be energized at a predetermined time relationship to each other, as controlled by the position of the adjustable first contact arm.

7. A synchronizing device of the type described comprising an insulation disc rotatably mounted, a shaped electrically conductive segment supported on said disc, an adjustable first contact arm for slidably engaging said conductive segment and connected in circuit with a flash lamp and a source of current, a stationary second contact arm for slidably engaging said conductive segment and connected in circuit with a shutter solenoid and the source of current, a stationary third contact arm for slidably engaging said conductive segment, means for adjusting the position of said first contact arm relative to the conductive segment and the stationary contact arms, a pair of yieldable contacts, one of said contacts electrically connected with the stationary third contact arm, the second contact connected in circuit with the source of current, a rotatable element coacting with the yieldable contacts, said element constructed and positioned to control engagement between said yieldable contacts by the element position, moving means operatively coupled with the rotatable element and the disc for rotating the same in a predetermined direction, and spring means associated with the rotatable element and the disc and constructed to be loaded in response to a movement of the moving means, said moving means constructed to dis-engage themselves from the movable element and the disc after completion of a predetermined movement to cause the spring means to return the rotatable element and the disc into the respective initial positions thereof at a predetermined ratio of movement for placing the contact segment in engagement with the contact arms at a predetermined sequence and for opening and closing said yieldable contacts at preselected intervals, thereby causing the solenoid and flash lamp circuits to be energized at a predetermined time relationship to each other, as controlled by the position of the adjustable first contact arm.

8. A synchronizing device as described in claim 7, wherein said yieldable contacts are constructed to engage each other when released by the rotatable element and to be dis-engaged by the rotatable element in response to rotation thereof in the predetermined direction, thereby disconnecting the circuit connections to the source of current.

9. A synchronizing device of the type described comprising an insulation disc rotatably mounted, a shaped electrically conductive segment supported on said disc, an adjustable first contact arm for slidably engaging said conductive segment and connected in circuit with a flash lamp and a source of current, a stationary second contact arm for slidably engaging said conductive segment and connected in circuit with a shutter solenoid and the source of current, a stationary third contact arm for slidably engaging said conductive segment, means for adjusting the position of said first contact arm relative to the conductive segment and the stationary contact arms, a pair of yieldable contacts, one of said contacts electrically connected with the stationary third contact arm, the second contact connected in circuit with the source of current, a third yieldable contact connected in circuit with an electric lamp and the source of current, a rotatable element coacting with the yieldable contacts, said element constructed and positioned to control engagement between said yieldable contacts by the element position, moving means operatively coupled with the rotatable element and the disc for rotating the same in a predetermined direction, and spring means associated with the rotatable element and the disc and constructed to be loaded in response to a movement of the moving means, said moving means constructed to dis-engage themselves from the movable element and the disc after completion of a predetermined movement to cause the spring means to return the rotatable element and the disc into the respective initial positions thereof at a predetermined ratio of movement for placing the contact segment in engagement with the contact arms at a predetermined sequence and for opening and closing said yieldable contacts at preselected intervals, thereby causing the solenoid and flash lamp circuits to be energized at a predetermined time relationship to each other, as controlled by the position of the adjustable first contact arm.

10. A synchronizing device as described in claim 9, wherein the yieldable contacts of said pair of yieldable contacts are constructed to engage each other and said third yieldable contact is constructed to be disengaged from said pair of yieldable contacts when said contacts are released by the rotatable element, and wherein the yieldable contacts of the pair of yieldable contacts are constructed to be disengaged from each other and the third yieldable contact is constructed to engage the second contact of the pair by the action of the rotatable element in response to a rotation thereof in the predetermined direction, thereby disconnecting the solenoid and flash lamp circuits to the source of current and connecting the electric lamp circuit during the said rotation of the rotatable element.

11. A synchronizing device as described in claim 7, wherein said conductive segment is arranged to be placed in a position disengaged from the contact arms after completion of the movement of the moving means in said predetermined direction, and wherein said conductive segment is shaped so as to engage different contact arms in different angular positions during the return rotation of the disc.

WILLIAM CASTEDELLO.